Sept. 4, 1956  D. G. RENNO  2,761,184
VENTILATOR WINDOW ASSEMBLY
Filed March 14, 1955  4 Sheets-Sheet 2
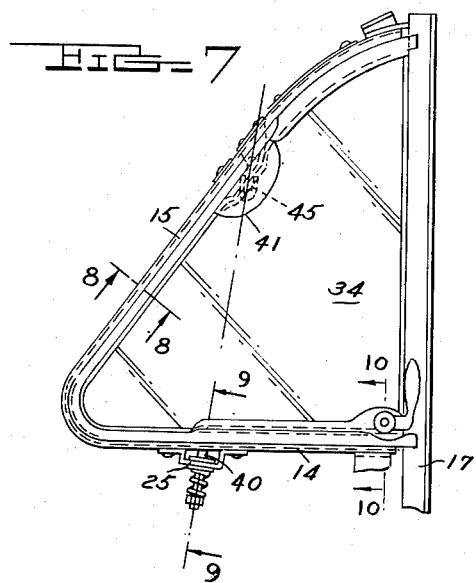
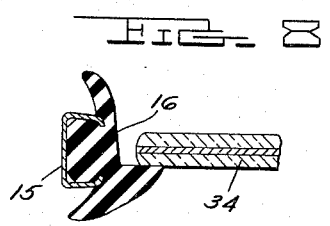
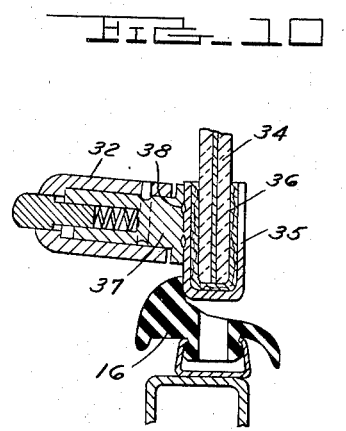
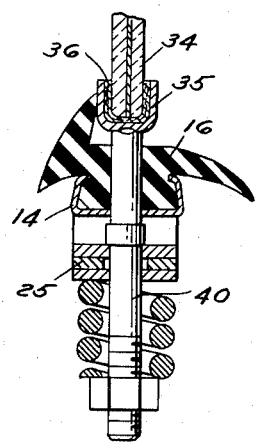
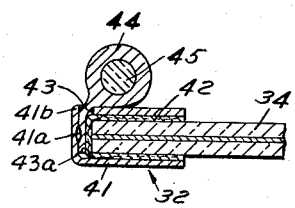
INVENTOR.
DONALD G. RENNO
BY
ATTORNEYS Sept. 4, 1956
D. G. RENNO
2,761,184
VENTILATOR WINDOW ASSEMBLY
Filed March 14, 1955
4 Sheets-Sheet 3
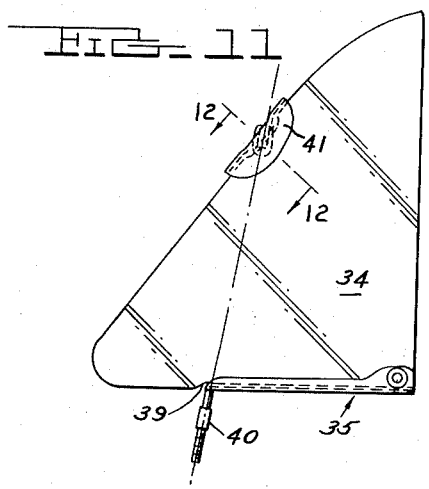
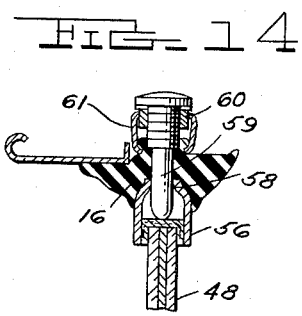
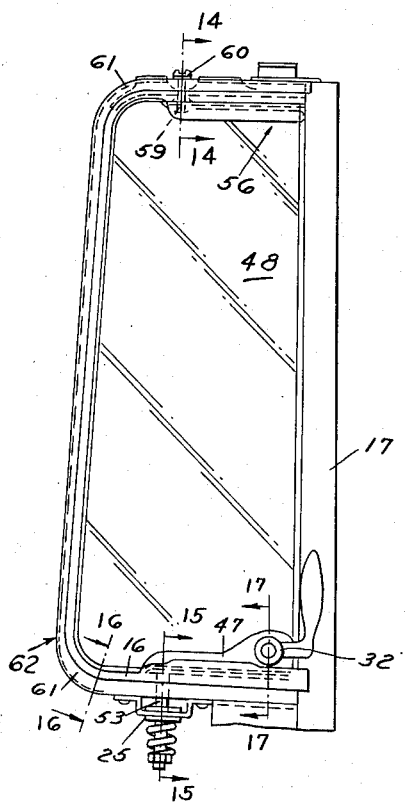
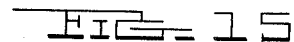
INVENTOR.
DONALD G. RENNO
BY
ATTORNEYS Sept. 4, 1956
D. G. RENNO
2,761,184
VENTILATOR WINDOW ASSEMBLY
Filed March 14, 1955
4 Sheets-Sheet 4
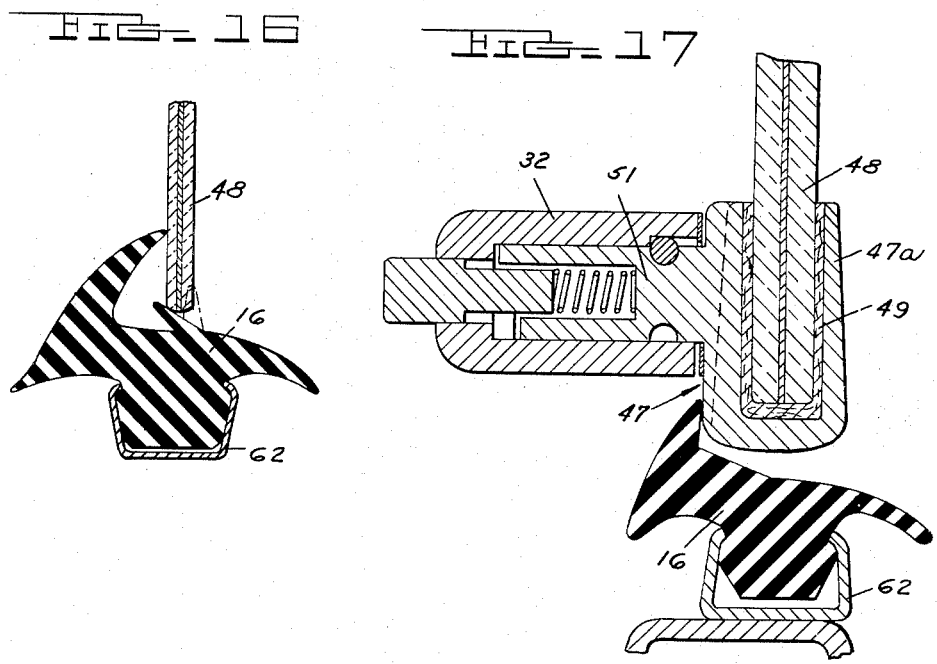
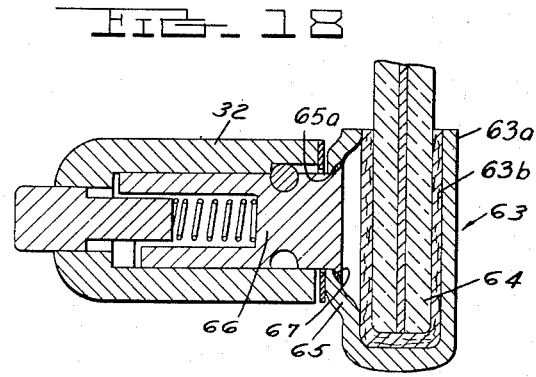
INVENTOR.
DONALD G. RENNO
BY
*Whitemore, Hulbert + Belknap*
ATTORNEYS United States Patent Office 2,761,184
Patented Sept. 4, 1956

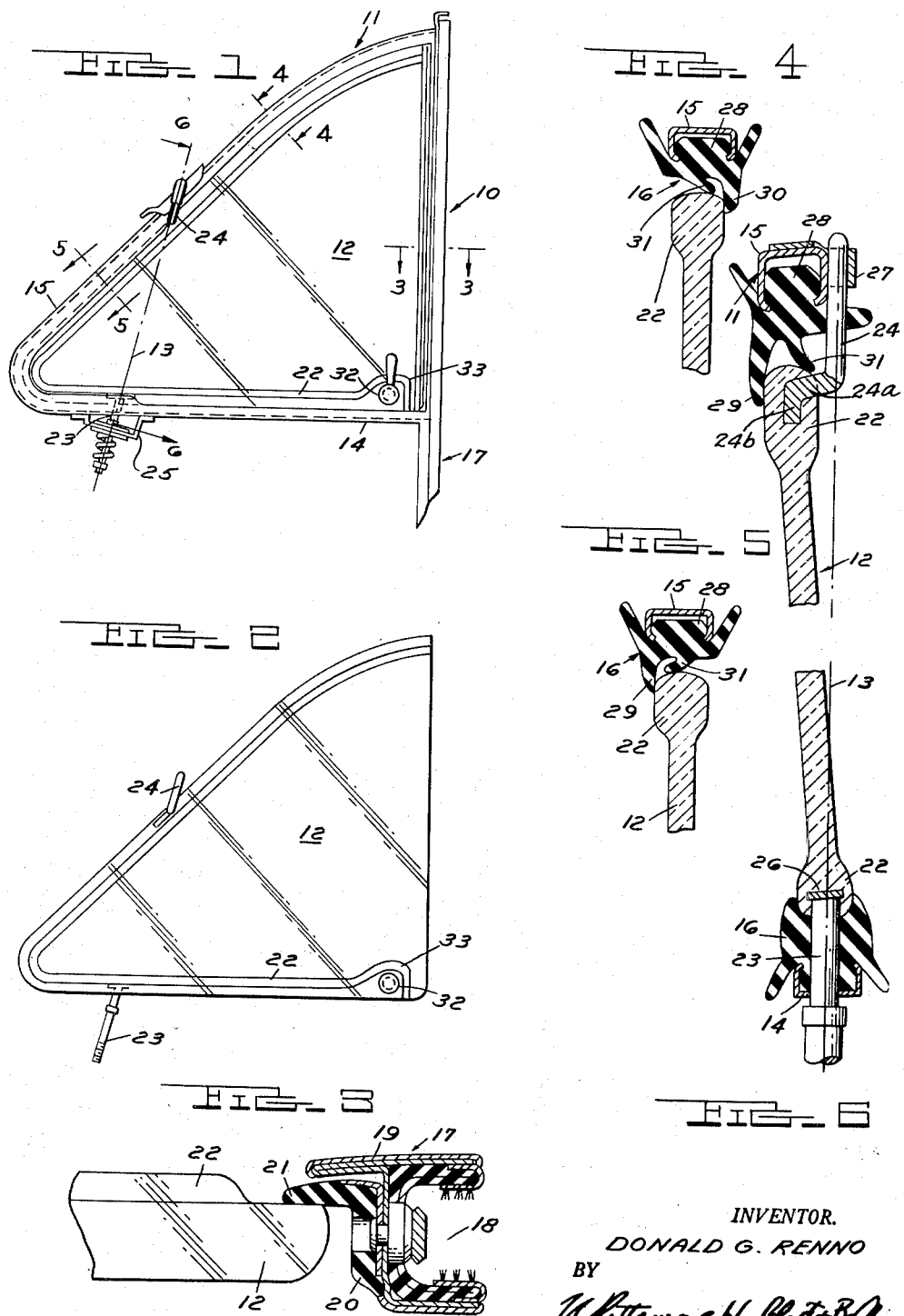

2,761,184

VENTILATOR WINDOW ASSEMBLY

Donald G. Renno, Birmingham, Mich., assignor to Motor Products Corporation, Detroit, Mich., a corporation of New York Application March 14, 1955, Serial No. 494,181

5 Claims. (Cl. 20—53)

This invention relates generally to vehicle body ventilator windows and refers more particularly to improvements in windows of the above type having a pivotal panel usually supported by a frame in the front part of the window opening for swinging movement about a substantially vertically extending axis.

Ventilator windows of the above general type, in addition to having a fixed frame, also have a supporting retainer channel secured to certain marginal edges of the pivotal panel by a sealing strip extending lengthwise of the retainer channel, this strip being within the channel and folded around the adjacent marginal edges of the panel. The retainer channel and sealing strip add considerably to the cost of manufacture of ventilator window assemblies, not only due to the actual cost of these items but also due to the equipment and time required in assembling the same with the pivoted panel.

With the above in view, it is an object of this invention to appreciably reduce the cost of ventilator window assemblies by eliminating the supporting retainer channel and the associated sealing strip aforesaid. In accordance with one modification of this invention, the pivoted panel has marginal edges that are enlarged in thickness and cross section relative to the body portion of the panel and that are unsupported by the usual retainer channel. In the present instance, the pivot pins for mounting the panel on the fixed frame, as well as the operator for the panel, are anchored directly to the enlarged marginal edges of the panel.

It is another object of this invention to provide a ventilator window of the above type wherein the pivot pins as well as the support for the panel operator are embedded within the enlarged marginal portions of the panel so as to be integrally secured thereto.

In accordance with other embodiments of the invention, and in the interest of employing a standard transparent ventilator panel lacking enlarged marginal edges, resort is had to the use of separate channel-like mounting clips which are applied by nesting the same over a margin of the panel. Panel pivoting provisions, as well as an operator and latching unit for the panel, are carried by these clips, which are employed only at the actual zones of pivotal connection of the panel to a fixed frame receiving the same. Accordingly a considerable portion of the forward margin of the transparent panel is free of the usual retainer channel and exposed in the frame. This exposed margin is engaged by weatherstripping associating with the frame to seal the pivoted panel in its closed position. A considerable reduction of cost of manufacture of the ventilator window is effected by thus minimixing the material and assembly costs attributable to a panel retainer channel and sealing strip.

The mounting provisions referred to above may take various forms. In one adaptation the pivoting and panel operating parts are inexpensively fabricated as a unitary die-casting and applied in a single operation to the proper zone or zones of the ventilator panel. In another instance, a channeled sheet metal stamping is employed, using welded connections to secure the pivot elements and/or window operator to the same and thus providing an integral, unitary mounting means for the pivot and operator.

The foregoing as well as other objects will be made more apparent as this description proceeds especially when considered in connection with the accompanying drawings, wherein:

Fig. 1 is a fragmentary side elevational view showing a ventilator window assembly embodying the features of this invention, in accordance with one embodiment thereof;

Fig. 2 is a side elevational view of the transparent panel for the window assembly of Fig. 1;

Figs. 3, 4, 5 and 6 are, respectively, sectional views in somewhat enlarged scale taken on lines 3—3, 4—4, 5—5 and 6—6 of Fig. 1;

Fig. 7 is a fragmentary view in side elevation of a ventilator window assembly in accordance with a modified embodiment of the invention;

Figs. 8, 9 and 10 are, respectively, sectional views in somewhat enlarged scale along lines 8—8, 9—9 and 10—10 of Fig. 7;

Fig. 11 is a view in side elevation of a transparent ventilator panel for the assembly of Fig. 7, more clearly showing the provisions for pivotally mounting same;

Fig. 12 is a fragmentary sectional view in enlarged scale taken along 12—12 of Fig. 11;

Fig. 13 is a fragmentary view in side elevation of a ventilator window installation in accordance with a still further modified embodiment of the invention;

Figs. 14, 15, 16 and 17 are, respectively, fragmentary views in enlarger scale in section along lines 14—14, 15—15, 16—16 and 17—17 of Fig. 12; and Fig. 18 is a fragmentary sectional view in enlarged scale of a slightly different embodiment of the invention, being in a section corresponding to the form of Fig. 17.

The ventilator window assembly 10 selected for the purpose of illustration in Figs. 1 through 6 as one embodiment of the invention comprises a frame 11 and a molded ventilator panel 12 supported within the frame for swinging movement about a substantially vertically extending axis 13. As shown in Fig. 1 of the drawings, the axis 13 of swinging movement of panel 12 is located intermediate the front and rear edges of the panel in a manner such that the front portion of the panel moves inwardly and the rear portion moves outwardly upon swinging movement of the panel from its closed position to its open position.

Frame 11 of the window assembly has a bottom bar 14 and a front bar 15 which extends rearwardly and upwardly from the front end of the bottom bar 14. Both of the above bars are channel-shaped in cross section and provide a substantially continuous inwardly opening channel for receiving a weatherstrip 16. The rear ends of the frame bars 14 and 15 are connected by a vertically extending bar 17 having a rearwardly opening channel 18 for slidably receiving the front edge portion of a vertically movable glass panel, not shown herein. Referring now to Figure 3 of the drawings, it will be noted that the bar 17 is provided with a vertically extending forwardly projecting flange 19 at the inner side of the bar. The flange 19 forms a recess with the base of the channel-shaped bar 17 and a vertically extending weatherstrip 20 is positioned within this recess. The weatherstrip is secured to the bar 17 and has a forwardly projecting lip 21 positioned to overlie the inner side of the panel 12 adjacent the rear edge of the latter when the panel is in its closed position, as shown in Fig. 3 of the drawings.

The ventilator panel 12 is formed of a transparent moldable material such, for example, as glass and is shaped to correspond to the opening formed by the frame bars 14, 15 and 17. In other words, the transparent panel 12 is of a shape and size to close the opening defined by the frame 11 when the panel is swung to its closed position. The marginal edge portions of the transparent panel 12 adjacent the frame bars 14 and 15 are enlarged in cross sectional area to form a bead 22 which extends continuously along the bottom and front marginal edges of the panel 12. As shown in Figs. 4 and 5 of the drawings, the marginal enlargement or bead 22 is symmetrical with respect to the median plane of the panel 12 and opposite sides of the bead 22 have surfaces lying substantially parallel to the median plane of the panel 12. The marginal enlargement or bead 22 is of a nature to impart ample strength to the panel 12 without the assistance of the usual glass retaining channel and the sealing strip or liner for said channel.

It has previously been stated that the transparent panel 12 is mounted on the frame 11 for swinging movement about the axis 13. For accomplishing this result, a pair of aligned pivot pins 23 and 24 are provided. The bottom pin 23 has the lower end rotatably supported on the bottom bar 14 of the frame 11 by a bracket 25 and has the upper end projecting into the bead 22 on the adjacent marginal edge of the panel 12. As shown in Fig. 6, a plate 26 is secured intermediate the ends thereof in abutting relationship to the upper end of the pivot pin 23 and is embedded within the bead 22.

The upper end of the pivot pin 24 is journaled in a bearing 27 secured to the top bar 15 of the frame, while the lower end of said pivot pin 24 is offset outwardly at 24a and then downwardly at 24b and is embedded in the bead 22.

In practice, the two pivot pins 23 and 24 are molded in place within the enlargement or bead 22 at the time the panel 12 is molded so that the plate of pin 23 and the pin 24 are embedded within the bead or enlargement 22 so that the pivot pins are in effect keyed to the enlargement or bead 22.

The clearance space between the enlargement or bead 22 and the adjacent bars of the frame 11 is sealed by the weatherstrip 16. The weatherstrip 16 has a base 28 which is seated within the channel of the adjacent frame bars and is secured to the latter. As shown in Fig. 5 of the drawings, the base 28 of the weatherstrip 16 has a flexible lip 29 which extends forwardly from the pivot pin 23 around the weatherstrip to the pivot pin 24 and is positioned to engage the outer surface of the adjacent bead 22 when the ventilator panel 12 is closed.

Referring now to Fig. 4 of the drawings, it will be noted that the base 28 of the weatherstrip 16 is fashioned with a second flexible lip 30 which extends rearwardly from the top pivot pin 24 to the end of the frame bar 15 and is arranged to engage the inner side of the adjacent bead 22 when the ventilator panel 12 is in its closed position. In accordance with conventional practice, a third lip similar to the lip 30 extends rearwardly from the bottom pivot 23 and engages the inner surface of the adjacent bead 22 of the ventilator panel 12 when the latter is in its closed position. Referring again to Figs. 4 and 5 of the drawings, it will be noted that the weatherstrip 16 has such an additional lip 31 which extends for substantially the full length of the weatherstrip and is positioned to engage the outer edge of the bead 22 of the ventilator panel 12 when the latter is in its closed position. It will be noted from Fig. 6 of the drawings that the weatherstrip is suitably apertured to provide for extending the respective pivot pins 23 and 24 therethrough.

The ventilator panel 12 is swung about the axis 13, and latched to division bar 17 when in closed position, by an operator 32 (Fig. 1) which projects inwardly from the ventilator panel 12 adjacent the rear edge of the latter. In practice, a part of operator 32 is molded in place in an enlarged rear portion 33 of bead 22 during molding of the ventilator panel 12 so that the part in question is integrally connected and keyed to the ventilator panel 12.

It follows from the foregoing that the present invention renders it possible to produce a commercially practical ventilator window assembly wherein the usual glass retaining channel and sealing strip are entirely omitted. Hence, the cost of the manufacture of the ventilator window assembly is substantially reduced. Moreover, the above results are accomplished by the present invention without sacrificing performance or durability since the marginal enlargement or bead 22 on the panel imparts ample strength to the latter.

A modified adaptation of the invention also possessing the advantages of the lowered cost of fabrication and assembly is illustrated in Figs. 7 through 12, and specific reference is best made to Fig. 11, in which a transparent ventilator panel 34 of flat, unbeaded cross section throughout is shown, which panel is to be pivotally associated within a frame opening conventionally defined by channeled bars 14, 15 and 17 at its bottom front and rear edges, respectively as in Figs. 1–6 inclusive. In the embodiment under consideration, the panel 34 is pivotally mounted in the frame by bottom and top channel members which are similar in cross sectional outline, as depicted in Figs. 9, 10 and 12.

The bottom member is in the form of a somewhat elongated U-shaped metal stamping 35 in which the rear portion of the lower margin of panel 34 is nested, being sealed in the channel by an interposed sealing strip 36 wrapped about its lower edge throughout the length of the mounting member. A stud 37, which is a part of an operator similar to operator 32 (Fig. 1), is projection welded to the inner surface of bottom channel member 35, as indicated at 38, and the operator 32 is engageable with division bar 17 to hold the ventilator panel closed, in the same manner as in the embodiment of Figs. 1 through 6. The bottom edge of ventilator panel 34 is recessed slightly at 39 (Figure 11) to receive member 35 in an approximately flush, longitudinally continuous relationship of the bottom of each.

Member 34 has a downwardly projecting pivot pin 40 welded or otherwise fixably secured to its bottom surface at the extreme lefthand end of the member, and in mounting panel 34 in the assembly of Fig. 7 the pin 40 is received by a pivot bracket 25 and associated parts on bottom frame bar 14, in the same way that bottom of panel 12 of Fig. 1 is mounted in its frame.

The forward margin of panel 34 is also relieved somewhat adjacent its top to receive a channel-shaped, top pivot mounting member 41. Member 41 nests over the recessed panel margin in this zone, with sealing material 42 interposed as in the case of bottom member 35. Channel 41 is provided with a side slot 43 adjacent its outer extremity, which slot receives a flange 43a of an upper pivot socket member 44 disposed in axial alignment with bottom pivot pin 40. Preferably the flange 43a is welded at 41a to the base 41b of the channel 41. Socket 44 receives a pivot pin 45 secured on frame bar 15.

As in the embedded pivot construction of Figs. 1 through 6, the pivotal axis through pins 40 and 45 is slightly inclined from the front to the rear. Mounting channels 35 and 41 are applied to the margin of panel 34 by crimping the same tightly thereon, and the margin of panel 34 on either side of both mounting members 35, 41 is freely exposed in the frame constituted by bars 14, 15 and 17, being overlapped and directly engaged by a lip of weatherstrip 16 on the latter to effect a tight seal when the panel 34 is closed.

The still further modified embodiment of the invention is illustrated in Figs. 13 through 17 of the drawings. In this adaptation of the invention, a bottom panel mounting member 47 in the form of an integral one-piece die casting is employed to receive the rear bottom margin of a transparent ventilator panel 48. Member 47 is molded as shown in Figs. 15 and 17 to provide a longitudinally extending channel 47a receiving panel 48 and a sealing strip 49, the channel 47a and strip 49 extending from the rear of panel 48 somewhat past the midpoint of its bottom edge. A mounting stud 51 for a manual operator similar to the operators 32 of Figs. 1 and 7 is cast as an integral part of member 47.

Mounting member 47 also has a depending pivot pin 53 (Fig. 15) cast integral therewith adjacent its forward end, and the pin 53 is received in a frame pivot bracket 25 like that of Figs. 1 and 7. A second pivot member or clip 56 is provided to pivot the panel 48 at its top margin; and this clip is preferably in the form of a metal stamping of inverted U-shaped cross section, as depicted in Fig. 14. It is apertured at 58 (see Fig. 14) in axial alignment with bottom pivot pin 53, the aperture 58 of clip serving as a pivot socket to receive a top pivot pin 59. Pin 59 is removable and has a threaded connection with an interiorly threaded member 60 carried by a channel-like top bar 61 of a frame 62 in which the panel 48 is pivoted. The conventional division bar 17 is secured to the frame 62, as in the other embodiments. Top pivot member 56 may, like bottom member 47, be a die-casting; however, a sheet metal stamping suffices for the purpose, is less expensive, and is therefore preferred.

Fig. 18 illustrates a further adaptation of the invention which may be substituted for a bottom panel mounting structure as shown in Figs. 13–17. Here a bottom panel mounting member 63 is in the form of a length of U-shaped metal stamping providing a longitudinally extending glass receiving groove or channel 63a in which ventilator panel 64 and a sealing strip 63b are disposed. The inner wall of the channel member 63 is offset at 65 and such offset portion is provided with an opening 65a to receive an operator mounting stud 66. The inner end of the stud 66 is flared at 67 to engage a corresponding seat on the inner side of said offset portion. The parts are secured by welding in the relationship shown in Fig. 18, thus to provide a unitary mount receiving the bottom margin of panel 64, as well as mounting the operator 32 of which stud 66 is a part. A similar welded connection may be employed to secure a bottom pivot pin which corresponds in structure and function to the pin 53 shown in Figs. 13 and 15.

In any of the embodiments, the elimination of the usual metal retainer channel at the forward edge of the ventilator panel has the effect of increasing visibility by eliminating the "blind spot" represented by the channel. If the weatherstrip has edge engagement with the panel, rather than being overlapped thereon, an even greater improvement is made in the respect noted.

What I claim as my invention is:

1. A ventilator window assembly comprising a plain unframed transparent pivotal panel, a fixed supporting frame for said panel, and two substantially vertically aligned pivotal connections between said panel and said frame, one of said pivotal connections embodying as a unit an upwardly opening channel embracing and shorter in length than the lower edge of said panel, a pivot pin projecting downwardly from the base of said channel and operatively connected to said supporting frame, and a mounting stud for a manual operator for the panel projecting laterally from one side of said channel, said channel, pivot pin and mounting stud being integrally connected to form the unit aforesaid, the other of said pivotal connections embodying a downwardly opening channel embracing and shorter in length than the upper edge of said panel, one side of said downwardly opening channel being provided adjacent the base of said channel with a slot, a socket member beside said downwardly opening channel and having a flange extending through said slot into said channel and anchored to the base of said channel, and a pivot pin within said socket member and operatively connected to said supporting frame.

2. A ventilator window assembly comprising a plain unframed transparent pivotal panel, a fixed supporting frame for said panel, and two substantially vertically aligned pivotal connections between said panel and said frame, one of said pivotal connections embodying as a unit an upwardly opening channel embracing and shorter in length than the lower edge of said panel, a pivot pin projecting downwardly from the base of said channel and operatively connected to said supporting frame, and a mounting stud for a manual operator for the panel projecting laterally from one side of said channel, said channel, pivot pin and mounting stud being integrally connected to form the unit aforesaid, the lower edge of said panel having a longitudinally extending recess receiving therein the base of said channel so that the lower surface of said base is substantially flush with the lower edge of said panel, the other of said pivotal connections embodying a downwardly opening channel embracing and shorter in length than the upper edge of said panel, one side of said downwardly opening channel being provided adjacent the base of said channel with a slot, a socket member beside said downwardly opening channel and having a flange extending through said slot into said channel and anchored to the base of said channel, and a pivot pin within said socket member and operatively connected to said supporting frame.

3. A ventilator window assembly comprising a plain unframed transparent pivotal panel, a fixed supporting frame for said panel, and two substantially vertically aligned pivotal connections between said panel and said frame, one of said pivotal connections embodying as a unit an upwardly opening channel embracing and shorter in length than the lower edge of said panel, a pivot pin projecting downwardly from the base of said channel and operatively connected to said supporting frame, and a mounting stud for a manual operator for the panel projecting laterally from one side of said channel, said channel, pivot pin and mounting stud being integrally connected to form the unit aforesaid, the other of said pivotal connections embodying a downwardly opening channel embracing and shorter in length than the upper edge of said panel, the base of said downwardly opening channel having an aperture serving as a pivot socket, an interiorly threaded member carried by the fixed supporting frame aforesaid, and a removable pivot pin threadedly engaging said interiorly threaded member and engaging said socket.

4. A ventilator window assembly comprising a plain unframed transparent pivotal panel, a fixed supporting frame for said panel, and two substantially vertically aligned pivotal connections between said panel and said frame, one of said pivotal connections embodying as a unit an upwardly opening channel embracing and shorter in length than the lower edge of said panel, a pivot pin projecting downwardly from the base of said channel and operatively connected to said supporting frame, and a mounting stud for a manual operator for the panel projecting laterally from one side of said channel, said channel, pivot pin and mounting stud being integrally connected to form the unit aforesaid, the other of said pivotal connections embodying a downwardly opening channel embracing and shorter in length than the upper edge of said panel, said downwardly opening channel being provided with a pivot socket, a member secured to the fixed supporting frame aforesaid, and a pivot pin adjustably engaging said member and removably engaging said socket.

5. A ventilator window assembly comprising a plain unframed transparent pivotal panel, a fixed supporting frame for said panel, and two substantially vertically aligned pivotal connections between said panel and said frame, one of said pivotal connections embodying as a unit an upwardly opening channel embracing and shorter in length than the lower edge of said panel, a pivot pin projecting downwardly from the base of said channel and operatively connected to said supporting frame, and a mounting stud for a manual operator for the panel projecting laterally from one side of said channel, said channel, pivot pin and mounting stud being integrally connected to form the unit aforesaid, the lower edge of said panel having a longitudinally extending recess receiving therein the base of said channel so that the lower surface of said base is substantially flush with the lower edge of said panel, the other of said pivotal connections embodying a downwardly opening channel embracing and shorter in length than the upper edge of said panel, said downwardly opening channel being provided with a pivot socket, and a pivot pin engaging said socket and operatively connected to said supporting frame.

References Cited in the file of this patent

UNITED STATES PATENTS

| | | |
|---|---|---|
| 2,062,475 | Paton | Dec. 1, 1936 |
| 2,062,524 | Parmenter | Dec. 1, 1936 |
| 2,073,878 | Palmer | Mar. 16, 1937 |
| 2,145,668 | Taylor | Jan. 31, 1939 |
| 2,183,684 | Lane | Dec. 19, 1939 |
| 2,361,609 | Doty | Oct. 31, 1944 |
| 2,676,055 | Humpal | Apr. 20, 1954 |